(12) United States Patent
Nishi

(10) Patent No.: US 8,985,169 B2
(45) Date of Patent: Mar. 24, 2015

(54) PNEUMATIC TIRE HAVING BLOCKS AND RAISED BOTTOM PORTIONS IN LUG GROOVES

(75) Inventor: Akihiro Nishi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 135 days.

(21) Appl. No.: 13/522,608

(22) PCT Filed: Jan. 18, 2011

(86) PCT No.: PCT/JP2011/050776
§ 371 (c)(1),
(2), (4) Date: Sep. 12, 2012

(87) PCT Pub. No.: WO2011/087134
PCT Pub. Date: Jul. 21, 2011

(65) Prior Publication Data
US 2013/0020001 A1      Jan. 24, 2013

(30) Foreign Application Priority Data

Jan. 18, 2010   (JP) ................................. 2010-008445

(51) Int. Cl.
*B60C 11/113*     (2006.01)
*B60C 11/11*      (2006.01)
(Continued)

(52) U.S. Cl.
CPC ......... *B60C 11/0306* (2013.01); *B60C 11/1369* (2013.01); *B60C 11/0309* (2013.01); *B60C 11/125* (2013.01); *B60C 2011/0369* (2013.01); *B60C 11/12* (2013.01)
USPC ................................. 152/209.19; 152/209.18

(58) Field of Classification Search
CPC ............ B60C 11/0309; B60C 11/1369; B60C 11/1353; B60C 2011/0355; B60C 2011/0367; B60C 2011/0369; B60C 2011/1361
USPC ..................................................... 152/209.19
IPC ....................................................... B60C 11/113
See application file for complete search history.

(56) References Cited

U.S. PATENT DOCUMENTS

2008/0149242 A1    6/2008   Oyama

FOREIGN PATENT DOCUMENTS

| JP | 2-293204 A | 12/1990 | |
| JP | 02293204 A | * 12/1990 | .............. B60C 11/11 |

(Continued)

OTHER PUBLICATIONS

Translation: JP02-293204; Matsumoto et al.; (no date).*

(Continued)

*Primary Examiner* — Steven D Maki
*Assistant Examiner* — Kendra Shin
(74) *Attorney, Agent, or Firm* — Sughrue Mion, PLLC

(57) ABSTRACT

A pneumatic tire capable of improving snowy road performance while controlling the occurrence of uneven wear of the tire due to buckling deformation. A tire 10 having a block pattern is provided with raised bottom portions 19 in lug grooves 15 extending in a direction intersecting with a main groove 13 and shoulder grooves 12, 14. The raised bottom portion 19 crosses the shoulder groove defining the center blocks 16 and shoulder blocks 17. The height of the raised bottom portion 19 is in a range of 10 to 20 percent of the groove depth of the shoulder groove. As a result, the edge components in the circumferential direction of the tire are increased and the rigidity in the axial direction of the tread 11 is uniformized without causing a decline in the draining characteristics.

6 Claims, 3 Drawing Sheets

(51) Int. Cl.
*B60C 11/03* (2006.01)
*B60C 11/13* (2006.01)
*B60C 11/12* (2006.01)

(56) References Cited

FOREIGN PATENT DOCUMENTS

| JP | 5-238209 A | | 9/1993 | | |
|----|---|---|---|---|---|
| JP | 06328911 A | * | 11/1994 | ............. | B60C 11/10 |
| JP | 10-035225 A | | 2/1998 | | |
| JP | 2001-187517 A | | 7/2001 | | |
| JP | 2004161202 A | * | 6/2004 | ............. | B60C 11/04 |
| JP | 2006-111216 A | | 4/2006 | | |
| JP | 2007-106314 A | | 4/2007 | | |
| JP | 2009-126280 A | | 6/2009 | | |
| JP | 2009-214761 A | | 9/2009 | | |

OTHER PUBLICATIONS

Machine Translation: JP06-328911; Otsubo, Takayuki; (no date).*
Machine Translation: JP2004-161202; Yakida, Masanori; (no date).*
International Search Report for PCT/JP2011/050776, dated Mar. 22, 2011.

* cited by examiner

FIG.5

| | CONVENTIONAL EXAMPLE (NO RAISED BOTTOM PORTION) | PRESENT INVENTION 1 (RAISED BOTTOM HEIGHT: 15%) | PRESENT INVENTION 2 (RAISED BOTTOM HEIGHT: 20%) | COMPARATIVE EXAMPLE (RAISED BOTTOM HEIGHT: 25%) |
|---|---|---|---|---|
| DRY ROAD STEERING STABILITY PERFORMANCE | 100 | 102 | 105 | 105 |
| SNOWY ROAD STEERING STABILITY PERFORMANCE | 100 | 103 | 105 | 105 |
| SNOWY ROAD ACCELERATION PERFORMANCE | 100 | 107 | 110 | 113 |
| WET BRAKING PERFORMANCE | 100 | 100 | 100 | 95 |

PNEUMATIC TIRE HAVING BLOCKS AND RAISED BOTTOM PORTIONS IN LUG GROOVES

CROSS REFERENCE TO RELATED APPLICATIONS

This application is a National Stage of International Application No. PCT/JP 2011/050776, filed on Jan. 18, 2011, which claims priority from Japanese Patent Application No. 2010-008445, filed on Jan. 18, 2010, the contents of all of which are incorporated herein by reference in their entirety.

TECHNICAL FIELD

The present invention relates to a pneumatic tire having a block pattern used for snow tires and the like, which features improved snowy road performance.

BACKGROUND ART

In the past, pneumatic tires having block patterns, such as snow tires, tended to suffer from lowered performance on the snowy road due to buckling of the tire even when the running tire had a normal internal pressure. Buckling is a phenomenon of a part of the tread surface lifting without touching the ground when the vehicle runs with the tire crown of the tread deformed inward. The buckling, which is also a cause of wear in the tire, can cause uneven wear of the tire.

To control buckling, it has been necessary to reduce the number of lug grooves and raise the rigidity of the blocks. However, the problem with reducing the number of lug grooves has been the decline in snowy road performance because of the corresponding decrease in the edge components in the circumferential direction of the tire.

In this regard, there have been proposed methods for retaining the snowy road performance without reducing the number of lug grooves. Such methods have relied on providing raised bottom portions (platforms) in the lug grooves in the shoulder area prone to low block rigidity, thereby raising the rigidity of the shoulder region of the tread (see Patent Document 1. for instance).

CONVENTIONAL ART DOCUMENT

Patent Document

Patent Document 1: Japanese Unexamined Patent Application Publication No. 2007-106314

SUMMARY OF THE INVENTION

Problem to be Solved by the Invention

However, the provision of raised bottom portions in the lug grooves in the shoulder area alone has not been sufficient to reduce buckling deformation of the tread and improve snowy road performance as well.

The present invention has been made in view of the foregoing problems, and an object thereof is to provide a pneumatic tire capable of improving snowy road performance while controlling the occurrence of uneven wear on the tire due to buckling deformation.

Means for Solving the Problem

The present invention provides a pneumatic tire with a tread having a plurality of blocks on its surface, the blocks defined by a plurality of circumferential grooves extending circumferentially about the tire and a plurality of lug grooves extending in a direction intersecting with the circumferential grooves. And the lug grooves have each a raised bottom portion (platform), and the raised bottom portion is so disposed as to cross a circumferential groove defining an intervening portion between center blocks located on the tread center side and shoulder blocks located on the tire shoulders.

As described above, the circumferential grooves have also raised bottom portions so formed as to be continuous with the raised bottom portions in the lug grooves. This arrangement not only increases edge components in the circumferential direction of the tire, but also raises the shear force of snow filling the circumferential grooves. As a result, the snowy road performance, such as the snowy road acceleration performance, can be improved.

Also, the continuous raised bottom portion crossing the circumferential grooves joins the raised bottom portions on the center block side and the shoulder block side in the lug groove together. As a result, the tire will have a uniform rigidity in the axial direction thereof. Accordingly, the snowy road performance of the tire can be improved while controlling the uneven wear due to buckling which often occurs with tires having a tread pattern with many lug grooves.

In another aspect, the invention provides a pneumatic tire for which the circumferential width of the raised bottom portion disposed in a part of the lug groove defining the center blocks (part of the lug groove between the center blocks) is narrower than the circumferential width of the lug groove.

This will further increase the edge components in the circumferential direction of the tire, thereby further improving the snowy road performance. It is to be noted that the circumferentially narrower part of the raised bottom portion may preferably be provided on the trailing-edge side of the circumferentially adjacent blocks when the tire rotates in the forward direction.

In still another aspect, the invention provides a pneumatic tire for which a slit is provided along each side of the raised bottom portion disposed in a part of the lug groove defining the shoulder blocks (part of the lug groove between the shoulder blocks), the side bordering on each of the shoulder blocks, and the width of the slit is such that the wall surface of the shoulder block and the wall surface of the raised bottom portion along the slit come in contact with each other when the tire contacts the ground.

In yet another aspect, the invention provides a pneumatic tire for which a sipe extending in a direction intersecting with the circumferential direction of the tire is provided in the raised bottom portion disposed in apart of the lug groove defining the shoulder blocks and the width of the sipe is such that the wall surfaces of the sipe come in contact with each other when the tire contacts the ground.

In these arrangements providing slits or sipes for the raised bottom portions, the circumferential width of the slits or sipes may be controlled such that the wall surface of the shoulder block and the wall surface of the raised bottom portion along the slit, or the wall surfaces of the sipe, come in contact with each other when the tire contacts the ground. In this manner, the shoulder blocks may be supported with certainty. Thus, the rigidity of the shoulder blocks which are susceptible to buckling can be further enhanced, and the snowy road performance of the tire can be improved while controlling uneven wear.

In a further aspect, the invention provides a pneumatic tire for which the height of the raised bottom portion is in a range of 10 to 20 percent of the depth of the circumferential groove which the lug groove crosses.

This will improve the snowy road performance of the tire while retaining adequate draining characteristics.

In a still further aspect, the invention provides a pneumatic tire for which the lug grooves are disposed in a manner oblique to the axial direction of the tire.

This will ensure that the edge components constantly work even within the contact patch of the tire fitted on the rim at the maximum load and maximum air pressure specified by the JATMA (Japan Automobile Tire Manufacturers Association) standard. And this arrangement improves the steering stability on the snow.

It is to be understood that the foregoing summary of the invention does not necessarily recite all the features essential to the invention, and subcombinations of all these features are intended to be included in the invention.

BRIEF DESCRIPTION OF THE DRAWINGS

FIG. 5 is a table showing the results of a performance test of the tire according to the present invention.

BEST MODE FOR CARRYING OUT THE INVENTION

Hereinafter, the invention will be described based on preferred embodiments with reference to the accompanying drawings.

First Embodiment

Figure 1:
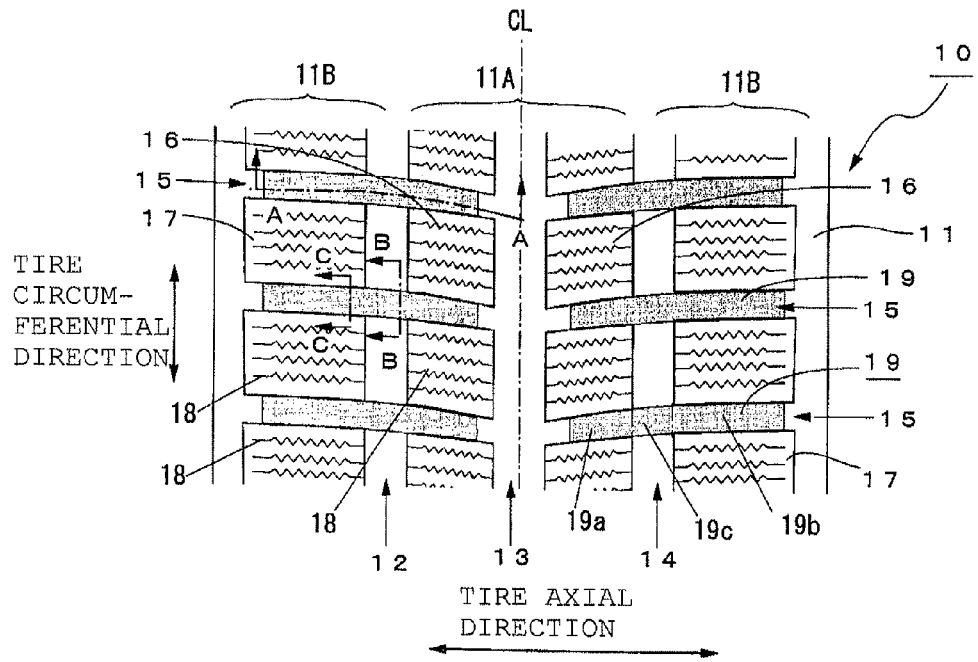
FIG. 1 is an illustration showing an example of a tread pattern of a pneumatic tire according to a first embodiment of the present invention.
Figure 2A:
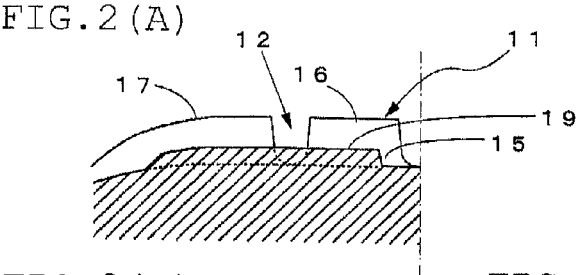
FIG. 2 is an A-A sectional view, a B-B sectional view, and C-C sectional views, respectively, of FIG. 1.

FIG. 1 is an illustration showing an example of a tread pattern of a pneumatic tire (hereinafter referred to as "tire") 10 according to a first embodiment of the present invention. FIG. 2A is an A-A sectional view, FIG. 2B a B-B sectional view, and FIGS. 2C and 2D C-C sectional views, respectively, of FIG. 1.

In each of these figures, reference numerals are such that 11 denotes a tread, 12 to 14 circumferential grooves, which are so disposed as to extend along the circumference of the tire in the tread surface of the tread 11, 15 lug grooves, which extend in axial directions of the tire, 16 and 17 blocks defined by the circumferential grooves 12 to 14 and the lug grooves 15, 18 sipes formed in the blocks 16 and 17, and 19 raised bottom portions (platforms) provided in the lug grooves 15. Note that CL shown by a dashed-dotted line in the figure represents the center line of the wheel. Also, the left side of the CL is referred to as the axially left side of the tire, and the right side thereof as the axially right side of the tire.

Hereinbelow, of the circumferential grooves 12 to 14, the circumferential groove p, which is located in the axial center of the tire, is called the main groove, and the left and right circumferential grooves 12, 14, which are respectively located in axially outer positions of the tire, are called the shoulder grooves. Also, the blocks 16, which are located in the tread center region 11A, are called the center blocks, and the blocks 17, which are located in the left and right tire shoulder regions 11B, are called the shoulder blocks.

Provided in each of the blocks 16 and 17 are sipes 18 which extend in directions intersecting with the circumferential direction of the tire. The sipes 18, which are normally a regular feature of snow tires or the like, function to improve the tire's snowy road performance by increasing the edge components in the circumference of the tire.

The raised bottom portion (platform) 19, as shown in FIG. 2A, rises from the bottom of the lug groove 15 between the shoulder blocks 17, 17, crosses the shoulder groove 12, which is a circumferential groove formed between the shoulder blocks 17 and the center blocks 16, and terminates by falling between the center blocks 16, 16. The raised bottom portion 19 crossing the shoulder groove 14 is also shaped in the same way as in FIG. 2A.

Thus, as shown in FIG. 1, the center block part 19a and the shoulder block part 19b of the raised bottom portion 19 in the lug groove 15 are joined with each other via the shoulder groove portion 19c of the raised bottom portion 19 within the shoulder groove 12 or 14. In other words, the raised bottom portion 19 is a continuous platform raised from the bottom of the lug groove 15 from the center block 16 side to the shoulder block 17 side, thus assuring a uniform rigidity of the tread 11 in the axial direction of the tire. Also, the shoulder groove portions 19c of the raised bottom portions 19 create circumferentially raised portions in the shoulder grooves 12 and 14. This increases edge components in the circumferential direction, thus raising the shear force of snow filling the tread grooves. Accordingly, the snowy road performance of the tire can be improved while controlling the occurrence of uneven wear of the tire due to buckling.

Figure 2B:
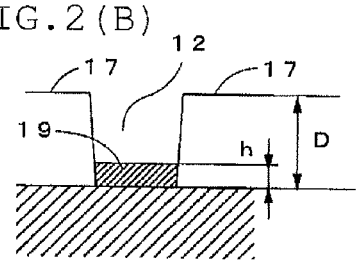

In this embodiment, it is preferable that the height h of the raised bottom portion 19, as shown in FIG. 2B, is set within a range of 10 to 20 percent of the depth D of the shoulder groove 12.

When the height h of the raised bottom portion 19 is in excess of 20 percent of the depth D of the shoulder groove 12, the snowy road performance of the tire, such as the acceleration and steering performance on the snow, may improve, but the draining characteristics may suffer. On the other hand, when the height h of the raised bottom portion 19 is less than 10 percent of the depth D of the shoulder groove 12, the volume of the raised bottom portion 19 will be too small to provide sufficient effects to enhance the edge effect and block rigidity. Therefore, the height h of the raised bottom portion 19 is preferred to be in a range of 10 to 20 percent of the depth D of the shoulder groove 12.

Also, as shown in FIG. 1, it is preferable that the lug grooves 15 are formed not in parallel with the axial direction of the tire but obliquely thereto. That is, the lug grooves 15 provided obliquely to the axial direction of the tire will cause the edge components to constantly work even within the contact patch of the tire fitted on the rim, at the maximum load and maximum air pressure specified by the JATMA standard. Therefore, this arrangement improves not only the acceleration performance on the snow but also the steering stability on the snow.

Figure 2C:
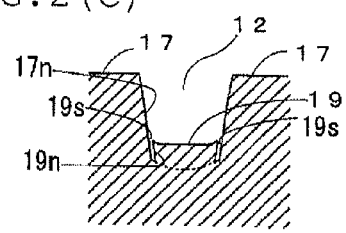
Figure 2D:
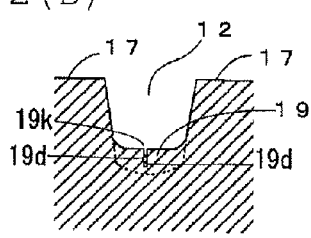

It is to be noted that while the shoulder block part 19b of the raised bottom portion 19 and the shoulder block 17 may adhere tightly to each other, there may be a slit 19s provided between the shoulder block 17 and the raised bottom portion 19 as shown in FIG. 2C or there may be a sipe 19k provided as shown in FIG. 2D.

The circumferential width of the slit 19s may be such that the side wall 19n of the raised bottom portion 19 and the side wall 17n of the shoulder block 17 come in contact with each other when the tire contacts the ground. Also, the circumferential width of the sipe 19k may be such that the wall surfaces 19d of the sipe 19k come in contact with each other when the tire contacts the ground.

In this manner, when the tire contacts the ground, the shoulder block 17 and the raised bottom portion 19 adhere tightly to each other, so that the raised bottom portion 19 supports the shoulder block 17 steadily. This will further enhance the rigidity of the shoulder blocks 17 where buckling can occur, thereby preventing uneven wear of the tire.

Note that the description in this regard is based on the assumption that the load and air pressure of the tire when it contacts the ground are set at the maximum load and maximum air pressure specified by the JATMA standard.

According to the first embodiment, therefore, a tire 10 having a block pattern is provided with raised bottom portions 19 in lug grooves 15 extending in a direction intersecting with a main groove p and shoulder grooves 12, 14. The raised bottom portions 19 cross the shoulder grooves 12 and 14 defining the center blocks 16 and shoulder blocks 17. The height h of the raised bottom portions 19 is set in a range of 10 to 20 percent of the groove depth D of the shoulder grooves 12 and 14. As a result, the snowy road performance of the tire is improved without causing a decline in the draining characteristics.

Also, the raised bottom portion 19 is a continuous platform raised from the bottom of the lug groove 15 from the center block 16 side to the shoulder block 17 side, thus assuring a uniform rigidity of the tread 11 in the axial direction of the tire. As a result, the occurrence of uneven wear of the tire due to buckling can be controlled effectively.

Second Embodiment

Figure 3:
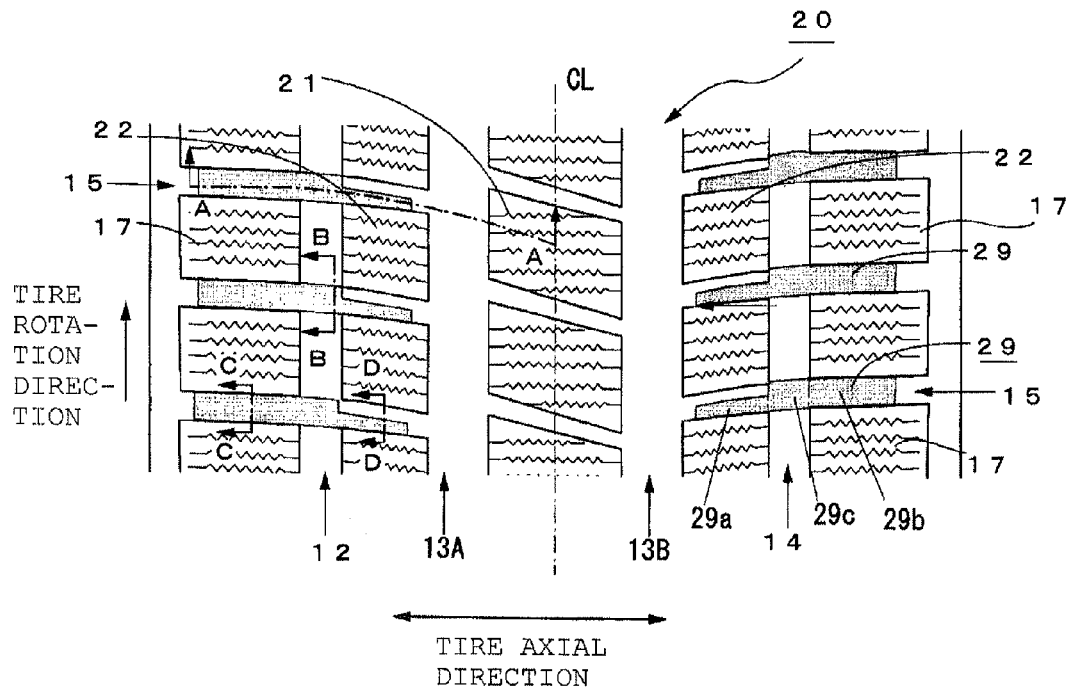
FIG. 3. is an illustration showing an example of a tread pattern of a pneumatic tire according to a second embodiment of the present invention
Figure 4A:
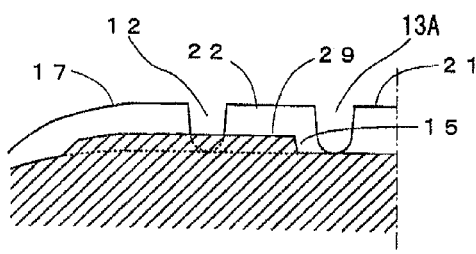
FIG. 4 is an A-A sectional view and a D-D sectional view, respectively, of FIG. 3.
Figure 4B:
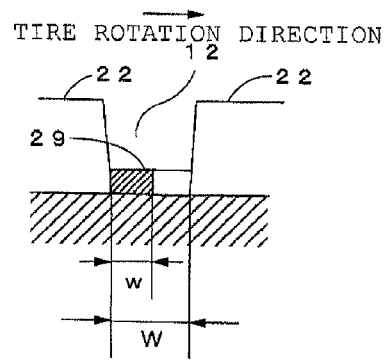

FIG. 3 is an illustration showing an example of a tread pattern of a pneumatic tire (hereinafter referred to as "tire") 20 according to a second embodiment of the present invention. FIG. 4A is an A-A sectional view, and FIG. 4B a D-D sectional view of FIG. 3. Note that a B-B sectional view and a C-C sectional view of FIG. 3, which are identical to FIG. 2B and FIG. 2C, are omitted.

The tire 20 according to this embodiment includes two main grooves pA, pB, two shoulder grooves 12, 14, center blocks 21, which are defined by the main groove pA, the main groove pB, and lug grooves 15, shoulder blocks 17, which are defined by the shoulder grooves 12, 14, and lug grooves 15, and intermediate blocks 22, which are defined by the main groove pA or the main groove pB, the shoulder grooves 12 or 14, and lug grooves 15.

The tire 20 according to this embodiment is provided with raised bottom portions (platforms) 29, each of which rises from the bottom of the lug groove 15 between the shoulder blocks 17, 17, crosses the shoulder groove 12 or 14, which is a circumferential groove formed between the shoulder blocks 17 and the intermediate blocks 22, and terminates by falling between the intermediate blocks 22, 22.

In this embodiment, the arrangement is such that the circumferential width w of the intermediate block part 29a of the raised bottom portion 29, which is the part defining the intermediate blocks 22, is narrower than the circumferential width W of the lug groove 15. At the same time, it is also so arranged that the intermediate block part 29a of the raised bottom portion 29 is provided on the trailing-edge side of the intermediate block 22 when the tire rotates in the forward direction. It should be noted that in this embodiment, the circumferential width of the shoulder block part 29b and the shoulder groove part 29c of the raised bottom portion 29 is equal to the circumferential width W of the lug groove 15.

Tires with an increased number of circumferential grooves, such as the tire 20 of FIG. 3, may display improved draining characteristics but reduced edge effect of the tire as a whole. Yet, the use of a circumferential width w of the intermediate block part 29a of the raised bottom portion 29, which is narrower than the circumferential width W of the lug groove 15, will increase the edge components in the circumferential direction of the tire, thereby improving the snowy road performance of the tire without causing a decline in the draining characteristics.

It should be appreciated also that a circumferential width w of the center block part 19a of the raised bottom portion 19, which is narrower than the circumferential width W of the lug groove 15, may be used for the tire 10 of the first embodiment, as with the second embodiment. Then the edge components in the circumferential direction of the tire can be increased, thereby further improving the snowy road performance of the tire.

Although the second embodiment has been explained using a tire 20 having a block pattern, it goes without saying that the present invention is applicable also to tires having tread patterns other than a block pattern, such as those having a rib-shaped center land in the place of a row of center blocks 21.

EXAMPLE

Tires having lug grooves provided with raised bottom portions (platforms) crossing the shoulder grooves (Present Invention 1, 2), a conventional tire having no raised bottom portions in the lug grooves (Conventional Example), and a tire having a higher raised bottom portions (Comparative Example) were prepared. They were fitted on a test vehicle, and running tests were conducted to evaluate their dry road steering stability, snowy road steering stability, snowy road acceleration performance, and wet braking performance. The results of the evaluation are shown in the table of FIG. 5.

The depth of the shoulder grooves of the tires used in the test was 9.1 mm.

The height of the raised bottom portion for the Present Invention 1 tire is 15 percent of the depth of the shoulder groove.

The height of the raised bottom portion for the Present Invention 2 tire is 20 percent of the depth of the shoulder groove.

The height of the raised bottom portion for the Comparative Example tire is 25 percent of the depth of the shoulder groove.

The size of the tires tested was 245/45R17. the rim used was 6.6 J, and the internal pressure was 220 kPa.

The dry road steering stability and the snowy road steering stability were evaluated with a test vehicle driven along a dry asphalt course and a snow-covered course around a 3-kilometer circuit. The times taken were recorded and represented by their reciprocal index numbers relative to 100 for that of the Conventional Example tire. The larger the number, the higher the performance.

To determine the snowy road acceleration performance, the test vehicle was driven at a speed of 5 km/h on the snow and then accelerated by stepping on the accelerator. In doing so, the time taken to reach the speed of 40 km/h (acceleration time) was measured, and a comparison was made by using index numbers relative to 100 for that of the Conventional Example tire. The larger the number is, the shorter the acceleration time and therefore the higher the snowy road acceleration performance will be.

To test the wet braking performance, a road surface covered with a 2 mm thick film of water was prepared. The test vehicle running at a speed of 80 km/h was decelerated by applying the brake, and the time taken until the vehicle came to a stop (deceleration time) was measured. A comparison was made by using index numbers relative to 100 for that of the Conventional Example tire. The larger the number is, the shorter the deceleration time and therefore the higher the wet braking performance will be.

As is evident from the table of FIG. 5, the tires according to the present invention both show improved snowy road steering stability and snowy road acceleration performance while maintaining adequate wet braking performance. Therefore, it has been confirmed that the lug grooves provided with raised bottom portions (platforms) crossing the shoulder grooves can improve the snowy road performance of the tire without causing a decline in the draining characteristics. Also, it is found that the tires of the invention show better dry road steering stability than the tire of a conventional example. Thus it has also been confirmed that the invention can control the occurrence of buckling of the tire.

On the other hand, the tire of a comparative example shows a little decline in the wet braking performance despite improved snowy road performance and dry road steering stability. This indicates that the height of the raised bottom portion is preferably 20 percent or less of the depth of the shoulder groove.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention.

Industrial Applicability

As described above, the present invention can improve the rigidity of the blocks and the edge effect of the tire without causing a decline in the draining characteristics. Therefore, it can provide a pneumatic tire capable of improving snowy road performance while controlling the occurrence of uneven wear of the tire due to buckling deformation.

Description of Reference Numerals 10 pneumatic tire
11 tread
11A tread center region
11b tire shoulder region
12, 14 shoulder groove
13 main groove
13A, 13B main groove
15 lug groove
16 center block
17 shoulder block
18 sipe
19 raised bottom portion (platform)
19a center block part of raised bottom portion
19b shoulder block part of raised bottom portion
18c shoulder groove part of raised bottom portion
20 pneumatic tire
21 center block
22 intermediate block
29 raised bottom portion (platform)

The invention claimed is:

1. A pneumatic tire comprising:
a tread having a plurality of blocks on the surface thereof, the blocks defined by a plurality of circumferential grooves extending circumferentially about the tire and a plurality of lug grooves extending in a direction intersecting with the circumferential grooves,
wherein the lug grooves have each a raised bottom portion and wherein the raised bottom portion is so disposed as to extend along with the lug grooves and to cross a circumferential groove defining an intervening portion of the circumferential groove between blocks located on the tread center side and shoulder blocks located on the tire shoulders,
the maximum depth along the centerline of each circumferential groove between adjacent blocks located on the tread center side and adjacent shoulder blocks is substantially constant over the entire length of the blocks located on the tread center side and shoulder blocks in the circumferential direction.

2. The pneumatic tire as recited in claim 1, wherein the circumferential width of the raised bottom portion disposed in a part of the lug groove defining the blocks located on the tread center side is narrower than the circumferential width of the lug groove.

3. The pneumatic tire as recited in claim 1, wherein a slit is provided along each side of the raised bottom portion disposed in a part of the lug groove defining the shoulder blocks, the side bordering on each of the shoulder blocks, and wherein the width of the slit is such that the wall surface of the shoulder block and the wall surface of the raised bottom portion along the slit come in contact with each other when the tire contacts the ground.

4. The pneumatic tire as recited in claim 1, wherein a sipe extending in a direction intersecting with the circumferential direction of the tire is provided in the raised bottom portion disposed in a part of the lug groove defining the shoulder blocks and wherein the width of the sipe is such that the wall surfaces of the sipe come in contact with each other when the tire contacts the ground.

5. The pneumatic tire as recited in claim 1, wherein the height of the raised bottom portion is in a range of 10 to 20 percent of the depth of the circumferential groove which the lug groove crosses.

6. The pneumatic tire as recited in claim 1, wherein the lug grooves are disposed in a manner oblique to the axial direction of the tire.

* * * * *